2,787,645
Patented Apr. 2, 1957

2,787,645

SEPARATION OF GAMMA BENZENE HEXACHLORIDE

Leo Danzker, Kenmore, and Judson A. Wood, Niagara Falls, N. Y., assignors to Olin Mathieson Chemical Corporation, a corporation of Virginia No Drawing. Application June 19, 1952, Serial No. 294,494

1 Claim. (Cl. 260—648)

Our invention relates to the separation of the isomeric forms of benzene hexachloride and in particular relates to improvements in the production of substantially pure gamma isomer of benzene hexachloride.

In the manufacture of benzene hexachloride, benzene is chlorinated to produce a mixture of several isomers of benzene hexachloride, principally the alpha, beta and gamma isomers. The crude product may be used as an insecticide but only the gamma isomer, which is usually in a proportion of about 10 to 15 percent, is active in this respect. It is, therefore, obviously advantageous to separate the insecticidally active gamma isomer from the inactive materials and it is particularly desirable to obtain the gamma isomer in concentrations of 99 percent or better, a material which is known commercially as lindane. However, the known separation processes are complicated and usually require that the crude benzene hexachloride be first separated and crystallized as a solid followed by a series of recrystallization or extraction steps using benzene or methanol as solvents to separate the gamma isomer. Because of the closely similar solubilities of the isomers, these steps are usually extensive and costly. Additional difficulties arise due to the extreme corrosiveness of methanolic solutions of benzene hexachloride. An effective means to reduce the unmber of steps and still produce substantially pure gamma isomer, i. e. lindane, is obviously economically advantageous.

We have devised an effective simplified process for producing the gamma isomer of benzene hexachloride, in concentrations meeting the specifications of lindane, using the molten crude benzene hexachloride as produced and involving only two major steps while obtaining lindane in excellent yields. Our invention comprises treating molten crude benzene hexachloride with methanol in an amount less than the weight of the crude benzene hexachloride, e. g. about 70 to 95 percent of the crude benzene hexachloride weight, in a two step process in which the molten crude benzene hexachloride and about 40 to 60 percent of the total methanol to be used are admixed, the mixture is agitated and cooled, and the balance of the total methanol is added. Precipitated and extracted alpha and beta isomers are separated and the gamma isomer of benzene hexachloride is recovered by crystallization in concentrations of 99 percent or better from the mother liquor after concentration.

According to the process of our invention, molten benzene hexachloride, advantageously as it is obtained by the evaporation of the benzene solution obtained in the chlorination step, is introduced into about 40 to 60 weight percent of the total amount of methanol to be used, that is, about 70 to 95 percent of the weight of the benzene hexachloride charged. Agitation is effected during the addition and is continued while the mixture is cooled slowly over a period of at least about two hours from its original temperature of, for example about 60° C., depending upon the temperature of the molten charge, to approximately room temperature. The balance of the total methanol to be used is then added and the agitation is continued for an additional period of about two hours. Both of the operations may be carried out as a single operation in a single vessel. The mixture is then centrifuged, filtered or subjected to some similar separation procedure to separate the crystals formed. A cake is obtained comprising the alpha and beta isomers and is advantageously washed with a small portion of fresh methanol. The mother liquor and washings usually contain approximately 30 to 40 percent of gamma isomer based on total solids. To obtain lindane, the liquor and washings are concentrated by the removal of a considerable proportion of methanol, preferably about one-half to two-thirds of the methanol originally charged, and the residue is cooled quickly to room temperature or lower. Maximum crystallization of the gamma isomer is obtained after stirring from about 4 to 6 hours or longer. The lindane crystals are then removed by filtering or centrifuging, washed with a minor proportion of fresh methanol and dried preferably in a vacuum drier at relatively low temperatures. The product is 99 percent or better gamma benzene hexachloride.

By the process of our invention excellent yields of lindane are obtained from molten crude benzene hexachloride while substantial economies in terms of reduction and simplification of operating steps are effected. For example, economies are effected by handling and utilizing crude molten benzene hexachloride instead of the solid thereby eliminating the solid separation step and crystallizing of flaking equipment for the crude solid. Moreover, economies are effected in that processing and handling steps involving the extremely corrosive methanolic solutions of benzene hexachloride are fewer and simpler than in previously known processes.

The crude benzene hexachloride that is effectively treated by our process may contain up to about 5 percent of benzene and by-products of the chlorination reaction, including chlorobenzenes and heptachlorocyclohexane, but greater recovery of lindane of better quality is possible the lower the proportion of these contaminants in the crude charged.

The total proportion of methanol used in the two steps of our process amounts to somewhat less than that of the benzene hexachloride charged in order to obtain the desired separation. If as much as an equal weight of methanol is used, considerably more alpha and beta isomer dissolve in the mixture and the resulting gamma concentrate is of too low a gamma content to meet the specification of lindane or the yield of lindane is reduced. Preferably, the total proportion of methanol used amounts to about 70 to 95 percent of the weight of the benzene hexachloride charged. The methanol is used in two portions of approximately equal weights. From about 40 to 60 percent of the methanol may be used in the first methanol addition step and the remaining portion in the second step. The amounts of methanol used in washing the lindane and by-products are relatively minor. All of the methanol is recovered by distillation and advantageously reused in the process.

In the crystal separating step following methanol treatment, a cake is obtained which contains about 90 percent of alpha and about 10 percent of beta benzene hexachloride. Minor proportions, usually to about 1 to 2 percent, of gamma isomer may be present in the cake. Advantageously the cake is washed with a small portion of fresh methanol. The cake may be used for non-insecticidal purposes or if desired a portion may be blended with gamma benzene hexachloride concentrates subsequently obtained in the process to produce high gamma mixtures.

Reduction of the mother liquor and washings from the lindane separation stage results in a concentrate of gamma benzene hexachloride containing approximately 25 to 30 percent of that isomer, the remainder consisting principally of alpha and delta isomers. The product is useful as a gamma isomer concentrate or if desired may be blended with all or part of the alpha-beta cake obtained earlier in the process to produce mixtures of any desired lower gamma concentration.

The time required for each operation described above is a minimum for operation on a practical scale. Longer periods of contact time may be used. The time is important in that the rate of cooling controls the crystal size and if cooled slowly over a period of at least about two hours the resulting crystals are more easily filtered or centrifuged with corresponding savings in equipment costs. Substantially longer times, however, are economically disadvantageous and result in no significant improvement in product or process. Preferably the mixture obtained in the first step of mixing molten benzene hexachloride with about half of the total methanol to be used should cool slowly over a minimum period of two hours to room temperature and the mixture obtained in the second step by the addition of the balance of the methanol should require about an equal time to be effective. In the crystallization of lindane from the reduced mother liquor from the alpha-beta separation, it is advantageous to avoid violent agitation since purer gamma isomer crystallizes under these conditions. Seeding with lindane is also advantageous.

While our invention is not limited to any theoretical discussion of the reasons for its effectiveness, it is believed that the alpha and beta isomers have a greater tendency to form supersaturated solutions than the gamma isomer and such a supersaturated solution of alpha and beta isomers prevents the separation of the gamma isomer. It was found that when the total amount of methanol to be used was added in one portion to the crude molten benzene hexachloride the alpha and beta isomers dissolved quickly to form a supersaturated solution and when the solution was concentrated alpha and beta isomers precipitated with the gamma isomer. However, if the total amount of methanol is divided, in the first methanol contacting step the less soluble alpha and beta isomers quickly saturate and the more soluble gamma isomer, being present in a smaller proportion, dissolves readily. In the second step, any supersaturation of the solution in alpha and beta is removed by the subsequent addition of the remaining portion of the methanol which both quickly extracts any undissolved gamma and reduces the concentration of alpha and beta isomers to below saturation. Crystals of alpha and beta isomers are separated and the filtrate containing about 30 to 40 percent gamma isomer, the remainder being principally alpha and beta isomers, is concentrated by evaporation. On cooling the concentrated filtrate, alpha and beta isomers tend to remain in supersaturated solution while the gamma isomer crystallizes.

The process of our invention will be further illustrated by reference to the following example:

About 1000 pounds of molten crude benzene hexachloride at a temperature of 130° C. was introduced through a 1-inch line into a stirred body of 450 pounds of methanol initially at room temperature. The temperature of the mixture rose to about 60° C. by the time the addition was complete and was stirred while cooling to room temperature over a period of about two hours. An additional 450 pounds of methanol was added and the stirring continued for two additional hours. The slurry was charged to a centrifuge and the cake washed with 80 pounds of methanol. The cake when dried consisted principally of alpha and beta benzene hexhcloride and contained only 1.5 percent of gamma isomer. The mother liquor and washings from the centrifuge were concentrated to a refractive index of 1.3940 at 25° C. and methanol was recovered overhead. The residual liquor was cooled and held at 25° C. for six hours. The mixture was then centrifuged, washing with 3 pounds of methanol. The dried lindane contained 99 percent of gamma isomer. The mother liquor was reduced to a solid concentrate containing about 32 percent gamma isomer. Recovered methanol was recycled.

We claim:

A process for separating the gamma isomer of benzene hexachloride from crude benzene hexachloride, which comprises contacting molten crude benzene hexachloride, as obtained by the chlorination of benzene, and methanol in an amount of about 40 to 60 percent of the total amount of methanol required, agitating and cooling the resulting mixture to approximately room temperature, contacting the cooled mixture with the balance of the total amount of methanol and agitating the resulting mixture, separating and concentrating a solution of gamma benzene hexachloride, cooling the concentrated solution to not more than about room temperature and separating substantially pure crystallized gamma benzene hexachloride, the total amount of methanol required being about 70 to 95 percent by weight of the molten crude benzene hexachloride.

References Cited in the file of this patent

UNITED STATES PATENTS

| | | |
|---|---|---|
| 2,553,956 | Burrage et al. | May 22, 1951 |
| 2,603,664 | Burrage et al. | July 15, 1952 |
| 2,699,455 | Smith et al. | Jan. 11, 1955 |